US008111963B2

(12) United States Patent
Putnam et al.

(10) Patent No.: US 8,111,963 B2
(45) Date of Patent: Feb. 7, 2012

(54) LARGE DIAMETER OPTICAL WAVEGUIDE, GRATING AND LASER

(75) Inventors: Martin A. Putnam, Cheshire, CT (US); Robert N. Brucato, Waterbury, CT (US); Paul E. Sanders, Madison, CT (US); Timothy J. Bailey, Longmeadow, MA (US); James M. Sullivan, Manchester, CT (US); Alan D. Kersey, South Glastonbury, CT (US)

(73) Assignee: Weatherford/LAMB, Inc., Houston, TX (US)

( * ) Notice: Subject to any disclaimer, the term of this patent is extended or adjusted under 35 U.S.C. 154(b) by 13 days.

(21) Appl. No.: 12/199,584

(22) Filed: Aug. 27, 2008

(65) Prior Publication Data

US 2008/0317420 A1 Dec. 25, 2008

Related U.S. Application Data

(60) Division of application No. 11/324,759, filed on Jan. 3, 2006, now Pat. No. 7,437,043, which is a continuation of application No. 09/455,868, filed on Dec. 6, 1999, now Pat. No. 6,982,996.

(51) Int. Cl.
*G02B 6/36* (2006.01)
(52) U.S. Cl. .................................................. 385/127
(58) Field of Classification Search .................. 385/123, 385/127
See application file for complete search history.

(56) References Cited

U.S. PATENT DOCUMENTS

| | | | |
|---|---|---|---|
| 3,222,615 A | 12/1965 | Sandor | |
| 3,684,980 A | 8/1972 | Kay | |
| 3,891,302 A | 6/1975 | Dabby et al. | |
| 3,916,182 A | 10/1975 | Dabby et al. | |
| 4,295,739 A | 10/1981 | Meltz et al. | |
| 4,307,938 A * | 12/1981 | Dyott | 385/123 |
| 4,358,851 A | 11/1982 | Scifres et al. | |
| 4,426,129 A * | 1/1984 | Matsumura et al. | 385/128 |
| 4,637,025 A | 1/1987 | Snitzer et al. | |
| 4,704,151 A | 11/1987 | Keck | |

(Continued)

FOREIGN PATENT DOCUMENTS

DE 19724528 A1 12/1998

(Continued)

OTHER PUBLICATIONS

J. J. Pan et al., "166-MW Single Frequency Output Power Interactive Fiber Lasers with Low Noise," IEEE Photonics Technology Letters, Jan. 1999 vol. 11(1): pp. 36-38.

(Continued)

*Primary Examiner* — Eric Wong
(74) *Attorney, Agent, or Firm* — Patterson & Sheridan, LLP

(57) ABSTRACT

A large diameter optical waveguide, grating, and laser includes a waveguide having at least one core surrounded by a cladding, the core propagating light in substantially a few transverse spatial modes; and having an outer waveguide dimension of said waveguide being greater than about 0.3 mm. At least one Bragg grating may be impressed in the waveguide. The waveguide may be axially compressed which causes the length of the waveguide to decrease without buckling. The waveguide may be used for any application where a waveguide needs to be compression tuned. Also, the waveguide exhibits lower mode coupling from the core to the cladding and allows for higher optical power to be used when writing gratings without damaging the waveguide. The waveguide may resemble a short "block" or a longer "cane" type, depending on the application and dimensions used.

19 Claims, 4 Drawing Sheets

U.S. PATENT DOCUMENTS

| | | | |
|---|---|---|---|
| 4,762,392 A | | 8/1988 | Yamamoto et al. |
| 4,787,086 A | | 11/1988 | Dentai et al. |
| 4,815,079 A | | 3/1989 | Snitzer et al. |
| 4,859,223 A | * | 8/1989 | Kajioka et al. ............... 65/403 |
| 4,915,467 A | | 4/1990 | Berkey |
| 4,948,217 A | | 8/1990 | Keck et al. |
| 5,042,898 A | | 8/1991 | Morey et al. |
| 5,048,026 A | | 9/1991 | Shaw et al. |
| 5,125,946 A | | 6/1992 | Bhagavatula |
| 5,129,029 A | | 7/1992 | Uemiya et al. |
| 5,136,677 A | | 8/1992 | Drexhage et al. |
| 5,170,458 A | | 12/1992 | Aoyagi et al. |
| 5,235,659 A | | 8/1993 | Atkins et al. |
| 5,237,638 A | | 8/1993 | Narcisco, Jr. |
| 5,349,600 A | | 9/1994 | Shinbori et al. |
| 5,425,039 A | | 6/1995 | Hsu et al. |
| 5,469,520 A | | 11/1995 | Morey et al. |
| 5,479,551 A | | 12/1995 | DiGiovanni et al. |
| 5,511,083 A | | 4/1996 | D'Amato et al. |
| 5,519,801 A | | 5/1996 | Le Noane et al. |
| 5,519,803 A | | 5/1996 | Shiono et al. |
| 5,666,372 A | | 9/1997 | Ball et al. |
| 5,682,453 A | | 10/1997 | Daniel et al. |
| 5,691,999 A | | 11/1997 | Ball et al. |
| 5,699,377 A | | 12/1997 | Pan |
| 5,745,626 A | | 4/1998 | Duck et al. |
| 5,771,251 A | | 6/1998 | Kringlebotn et al. |
| 5,815,627 A | | 9/1998 | Harrington |
| 5,817,944 A | | 10/1998 | Chung |
| RE35,946 E | | 11/1998 | Ainslie et al. |
| 5,841,131 A | * | 11/1998 | Schroeder et al. ....... 250/227.17 |
| 5,852,622 A | | 12/1998 | Meissner et al. |
| 5,933,437 A | | 8/1999 | Delavaux |
| 6,018,534 A | | 1/2000 | Pan et al. |
| 6,031,849 A | | 2/2000 | Ball et al. |
| 6,144,026 A | * | 11/2000 | Udd et al. ............... 250/227.14 |
| 6,229,827 B1 | | 5/2001 | Fernald et al. |
| 6,360,565 B1 | * | 3/2002 | Christoff et al. ............... 65/403 |
| 6,422,084 B1 | | 7/2002 | Fernald et al. |
| 6,452,667 B1 | | 9/2002 | Fernald et al. |
| 6,477,295 B1 | | 11/2002 | Lang et al. |
| 6,490,931 B1 | | 12/2002 | Fernald et al. |
| 6,519,388 B1 | | 2/2003 | Fernald et al. |
| 6,982,996 B1 | | 1/2006 | Putnam et al. |
| 2002/0154860 A1 | | 10/2002 | Fernald et al. |
| 2002/0172446 A1 | | 11/2002 | Fernald et al. |
| 2002/0194917 A1 | | 12/2002 | Fernald et al. |

FOREIGN PATENT DOCUMENTS

| | | |
|---|---|---|
| EP | 0162303 A2 | 11/1985 |
| EP | 0212954 A2 | 3/1987 |
| EP | 0302745 A2 | 2/1989 |
| EP | 0320990 A2 | 6/1989 |
| EP | 0352751 A2 | 1/1990 |
| EP | 0409447 A2 | 1/1991 |
| EP | 0359351 B1 | 9/1992 |
| EP | 0884614 A1 | 12/1998 |
| WO | 8204328 A1 | 12/1982 |
| WO | 9530926 A1 | 11/1995 |

OTHER PUBLICATIONS

A. Iocco et al., "Bragg Grating Fast Tunable Filter for Wavelength Division Multiplexing," Jul. 1999 vol. 17(7): pp. 1217-1221.

V. C. Lauridsen et al., "Design of DFB Fibre Lasers," Electronics Letters, Oct. 1998 vol. 34(21): pp. 2028-2030.

P. Varming et al., "Erbium doped fibre DFB laser with permanent .pi./2 phase-shift induced by UV post-processing," IOOC 1995, Tech Digest, 1995 vol. 5: pp. PD1-PD3.

J. L. Cruz et al., "Improved thermal sensitivity of fiber Bragg gratings using a polymer overlayer," Electronics Letters, 1996 vol. 32(4): pp. 385-387.

J. J. Pan et al., "Interactive Fiber Lasers with Low Noise and Controlled Output Power," Conference on Lasers and Electro-Optics Europe, Sep. 1998: p. 381.

Yu Lung Lo, "Using in-fiber Bragg-grating sensors for measuring axial strain and temperature simultaneously on surfaces of structures," Optical Engineering, Aug. 1998 vol. 37(8): pp. 2272-2276.

A. A. Hamza et al., "Measurement of refractive indices of homogeneous fibers with regular or irregular transverse sections," Journal of Applied Physics, Sep. 1990 vol. 68(6): pp. 2639-2642.

* cited by examiner

LARGE DIAMETER OPTICAL WAVEGUIDE, GRATING AND LASER

CROSS REFERENCE TO RELATED APPLICATIONS

This is a divisional application of U.S. patent application Ser. No. 11/324,759 filed Jan. 3, 2006 now U.S. Pat. No. 7,437,043, which is a continuation of U.S. patent application Ser. No. 09/455,868 filed Dec. 6, 1999, now U.S. Pat. No. 6,982,996 issued on Jan. 3, 2006, which are both incorporated herein by reference in their entirety.

TECHNICAL FIELD

This invention relates to optical waveguides, gratings and lasers and, more particularly, to optical waveguides, gratings and lasers having a large diameter.

BACKGROUND ART

It is known that optical fibers are stronger in compression than in tension, as described in U.S. Pat. No. 5,469,520, entitled "Compression Tuned Fiber Grating," to Morey et al. It is also known that Bragg gratings embedded in the optical fiber may be used in compression to act as a tunable filter or tunable fiber laser, as is described in U.S. Pat. No. 5,469,520, entitled "Compression Tuned Fiber Grating," to Morey et al. and U.S. Pat. No. 5,691,999, entitled "Compression Tuned Fiber Laser," to Ball et al., respectively, which are hereby incorporated herein by reference.

To avoid fiber buckling under compression, the technique described in the aforementioned U.S. Pat. Nos. 5,469,520 and 5,691,999 uses sliding ferrules around the fiber and grating and places the ferrules in a mechanical structure to guide, align and confine the ferrules and the fiber. However, it would be desirable to obtain a configuration that allows a fiber grating to be compressed without buckling and without sliding ferrules and without requiring such a mechanical structure.

Also, it is known to attach an optical fiber grating to within a glass tube to avoid buckling under compression for providing a wavelength-stable temperature compensated fiber Bragg grating as is described in U.S. Pat. No. 5,042,898, entitled "Incorporated Bragg Filter Temperature Compensated Optical Waveguide Device," to Morey et al. However, such a technique exhibits creep between the fiber and the tube over time, or at high temperatures, or over large compression ranges.

It is also known that Bragg gratings in optical fibers may create unwanted coupling between the core and cladding modes of a fiber. The larger the mode field overlap between the two modes, the larger the coupling. Such coupling creates unwanted optical losses in the fiber.

It is also known that when writing Bragg gratings in optical fibers, if high power is used, the fiber may be damaged due to surface ablations on the surface of the fiber caused by the high optical power.

SUMMARY OF THE INVENTION

Objects of the present invention include provision of a waveguide configuration that is suitable for compression without buckling and without requiring sliding ferrules or a mechanical supporting structure for the ferrules and/or that is suitable for reducing core to cladding coupling and/or that allow for increase optical power to be used when writing gratings.

According to the present invention, an optical waveguide having outer dimensions along perpendicular longitudinal and transverse directions, the optical waveguide comprising: an outer cladding; a single inner core disposed in the outer cladding, the inner core propagating light in substantially askew spatial modes; wherein at least a portion of the optical waveguide has a transverse cross-section that is continuous, comprises substantially the same material, and has an outer transverse dimension greater than about 0.5 mm; and at least a portion of the optical waveguide is a non-planar waveguide. According further to the present invention, the waveguide comprises a glass material, such as silica.

According further to the present invention, said core has an outer core dimension of less than about 12.5 microns. According further to the present invention, said core propagates light in substantially a single spatial mode.

According further to the present invention, the waveguide has a cylindrical shape. According further to the present invention, the core has a circular end cross-sectional shape. According further to the present invention, the outer dimension of the waveguide is greater than about 0.9 mm. According still further to the present invention, a reflective element is embedded in the waveguide.

The present invention provides a significant improvement over prior art optical fibers by providing a glass (or silica-based) optical waveguide having a large diameter which allows for axial compression tuning without buckling the waveguide. The invention provides a surface to push against instead of having to bond, fuse or otherwise attach such surface to an optical fiber. The present invention also reduces coupling between the core and cladding modes due to the increased end cross-sectional area between the core and cladding of the waveguide. Further, the invention allows for more optical power to be used when writing a grating in the waveguide without ablating the waveguide surface, due to the increased thickness of the cladding.

One or more gratings may be embedded (or imprinted) in the waveguide. The waveguide may be used for compressing a grating or laser to provide compression tuning in many applications. The waveguide may also be used for other applications that do not require a grating but require a compressible optical waveguide. Also, the large outer diameter allows the waveguide to resist damage from handling which typical bare optical fibers would exhibit.

The waveguide may be etched to provide alternative side (or axial) cross-sectional geometries, e.g., a dogbone shape that provides enhanced force to length change (or strain) sensitivity. Also, the waveguide may resemble a short "block" or a longer "cane" type, depending on the application and dimensions used. Further, the waveguide may be made in long lengths (on the order of inches, feet, or meters) then cut to size as needed for the desired application. Also, one or more gratings, fiber lasers, or a plurality of cores or concentric or ring cores, may be located within the waveguide cladding, thereby allowing for multiple waveguiding paths within the waveguide.

The foregoing and other objects, features and advantages of the present invention will become more apparent in light of the following detailed description of exemplary embodiments thereof.

BEST MODE FOR CARRYING OUT THE INVENTION

Figure 1:
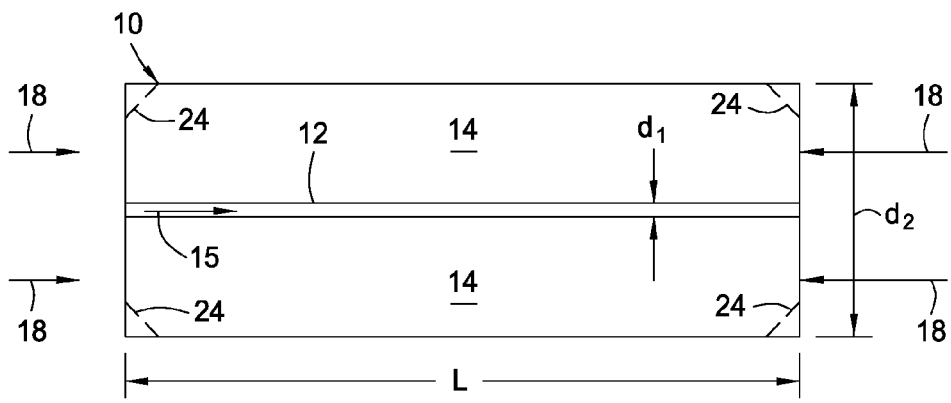
FIG. 1 is a side view of a large diameter optical waveguide, in accordance with the present invention.

Referring to FIG. 1, a large diameter optical waveguide 10, has at least one core 12 surrounded by a cladding 14. The waveguide 10 comprises silica glass ($SiO_2$) based material having the appropriate dopants, as is known, to allow light 15 to propagate in either direction along the core 12 and/or within the waveguide 10. The core 12 has an outer dimension d1 and the waveguide 10 has an outer dimension d2.

The cladding 14 has an outer dimension d2 of at least about 0.3 mm and the core 12 has an outer dimension d1 such that it propagates only a few spatial modes (e.g., less than about 6). For example for single spatial mode propagation, the core 12 has a substantially circular transverse cross-sectional shape with a diameter d1 less than about 12.5 microns, depending on the wavelength of light. One standard telecommunications nominal core diameter is 9 microns (and outer waveguide diameter of 125 microns). The invention will also work with larger or non-circular cores that propagate a few (less than about 6) spatial modes, in one or more transverse directions.

Further, the optical waveguide 10 may be a birefringent, polarization maintaining, polarizing, multi-core, or multi-cladding optical waveguide, or planar waveguide (where the waveguide is rectangular shaped), or other waveguides meeting the properties described herein.

Also, other materials for the optical waveguide 10 may be used if desired. For example, the waveguide 10 may be made of any glass, e.g., silica, phosphate glass, or other glasses, or made of glass and plastic, or solely plastic. For high temperature applications, an optical waveguide made of a glass material is desirable.

Also, the waveguide 10 may have tapered (or beveled or angled) outer corners or edges 24 to provide a seat for the waveguide 10 to mate with another part (not shown) and/or to adjust the force angles on the waveguide 10, or for other reasons. The angle of the beveled corners 24 are set to achieve the desired function.

Also, the outer diameter d2 of the cladding 14 and the length L have values that will resist buckling when the waveguide 10 is placed in axial compression as indicated by the arrows 18. The length L of the waveguide 10 may be determined experimentally or analytically as discussed more hereinafter.

Figure 2:
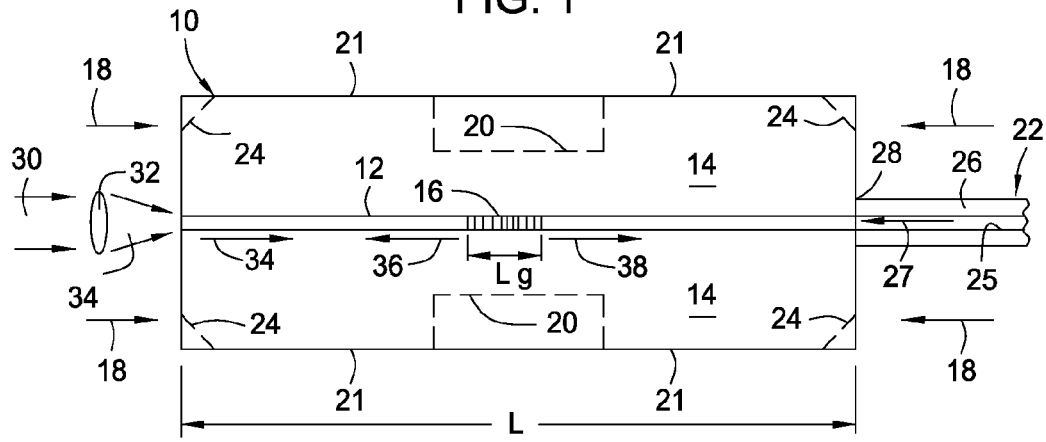
FIG. 2 is a side view of a large diameter optical waveguide with a grating embedded therein, in accordance with the present invention.

Referring to FIG. 2, the waveguide may have a Bragg grating 16 impressed (or embedded or imprinted) therein. A Bragg grating 16, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics," to Glenn et al.; and U.S. Pat. No. 5,388,173, entitled "Method and Apparatus for Forming Aperiodic Gratings in Optical Fibers," to Glenn, which are hereby incorporated by reference to the extent necessary to understand the present invention. The grating 16 may be in the core 12 and/or in the cladding 14 (not shown). Any wavelength-tunable grating or reflective element embedded, etched, imprinted, or otherwise formed in the waveguide 10 may be used if desired. The waveguide 10 may be photosensitive if a grating 16 are to be written into the waveguide 10. As used herein, the term "grating" means any of such reflective elements. Further, the reflective element (or grating) 16 may be used in reflection and/or transmission of light.

The grating 16 has a grating length $L_g$ which is determined based on the application and may be any desired length. A typical grating 16 has a grating length $L_g$ in the range of about 3-40 mm. Other sizes or ranges may be used if desired. The length $L_g$ of the grating 16 may be shorter than or substantially the same length as the length L of the waveguide 10. Also, the core 12 need not be located in the center of the waveguide 10 but may be located anywhere in the waveguide 10.

Incoming light 27 may be launched into the waveguide 10 and/or the core 12 by splicing a suitable standard optical fiber 22 (having a cladding 26 and a core 25) to one or both axial ends 28 of the waveguide 10 using any known or yet to be discovered techniques for splicing fibers or coupling light from an optical fiber into a larger waveguide, that provides acceptable optical losses for the application. Alternatively, incident light 34 may be directly incident on the core or be focused into the core 12 by a lens 32 which focuses input light 30.

If a grating 16 is in the waveguide 10, light 34 is incident on the grating 16 which reflects a portion thereof as indicated by a line 36 having a predetermined wavelength band of light, and passes the remaining wavelengths of the incident light 34 (within a predetermined wavelength range), as indicated by a line 38 (as is known).

It is known that for a mechanically unguided silica optical fiber under compression, the maximum allowable length $L_{cr}$ of the waveguide 10 can be without buckling depends on the critical applied load $F_{cr}$, and can be analytically determined based on the buckling theory of columns, as described in A. Iocco et al., "Bragg Grating Fast Tunable Filter for Wavelength Division Multiplexing," IEEE, Journal of Lightwave Technology, Vol. 17, No. 7, July 1999, pp. 1217-1221, which is incorporated herein by reference and described briefly below for illustrative purposes.

As discussed in the aforementioned article, the Euler buckling load formula for a column is:

$$F_{cr} = \frac{\pi^2 EI}{(\alpha L)^2} \qquad \text{Eq. 1}$$

where $F_{cr}$ is the critical force, L is the pro-compressed unguided length, and $\alpha$ is the effective-length factor which is 0.5 for a column perfectly fixed (rigid) and straight at both ends, and where $I=\pi r^4/4$ is the inertia modulus for a circular cross section, and r is the radius of the column (or waveguide).

The relationship between the axial stress and axial strain for a material in the elastic domain and in the axial (or longitudinal) direction, is given by:

$$\sigma = E\epsilon \quad \text{Eq. 2}$$

where E is the Young modulus which is $7.25 \times 10^4$ N/mm² for silica and $\epsilon$ is the axial strain which is defined by $\Delta L/L$, where $\Delta L$ is the axial displacement and L is axial length.

If a Bragg grating is in the waveguide, the relationship between axial strain and wavelength shift for the grating is as follows:

$$\frac{\Delta \lambda}{\lambda} = (1 - p_e)\varepsilon \quad \text{Eq. 3}$$

where $p_e$ is the photo-elastic coefficient which is about 0.21 for silica $\lambda$ is the initial wavelength and $\Delta\lambda$ is the wavelength shift. Substituting Eqs. 1, 2, 3 and taking into account that the axial stress $\sigma$ is given by the applied force multiplied by the waveguide surface area, the critical length $L_{cr}$ is calculated as follows:

$$L_{cr} = \frac{\pi r}{2\alpha} \sqrt{\frac{\lambda(1 - p_e)}{\Delta\lambda}} \quad \text{Eq. 4}$$

For example, for a mechanically unguided standard telecommunications silica-based optical fiber having an outer diameter of 125 microns (r=0.0625 mm in Eq. 1) and an initial wavelength $\lambda$ of about 1550 nm, $L_{cr}$=1.08 mm before buckling occurs for a wavelength shift $\Delta\lambda$ of 40 nanometers (nm). Accordingly, a standard optical fiber would need to be no longer than 1.08 mm long to not buckle under an axial strain equivalent to shift a grating 40 nm. However, in practice, this length will be shorter than 1.08 mm because the end conditions are in general not perfectly rigid and straight. This may be accounted for by adjusting the value of $\alpha$ in Eq. 1 for the waveguide end conditions.

We have found that the wavelength shift (or tuning range) $\alpha\lambda$ in nm that can be achieved without buckling for a silica waveguide having a given diameter (d) and length (L) is as follows:

$$\Delta\lambda = \frac{(\pi^2 d^2)(1200)}{16L^2 \alpha^2 (FS)} \quad \text{Eq. 5}$$

where $\alpha$ is a waveguide end condition scale factor or "fixity scale factor" (discussed hereinbefore with Eq. 1) and FS is a safety scale factor. A value of $\alpha$=4 for ideally fixed end conditions and $\alpha$=1 for ideal pinned end conditions. We have found that a value for $\alpha$ of about 0.6 is representative for a waveguide with coned seat end conditions, i.e., the tapered edges 24 (30 to 60 degrees from vertical; however, other angles may be used). Other values force may be used depending on the geometry of the end conditions, the geometry of the waveguide, e.g., dogbone or straight, discussed hereinafter, and other factors. The value for FS is set based on dimensional tolerances, reliability, repeatability, statistical data variations, and other factors.

Accordingly, we have found that an outer diameter d2 of greater than about 400 microns (0.4 mm) provides acceptable results (without buckling) for a waveguide length L of 5 mm, over a grating wavelength tuning range of about 10 nm (with FS=1.3). For a given outer diameter d1, as the length L increases, the wavelength tuning range (without buckling) decreases. Other diameters d2 for the waveguide 10 may be used depending on the overall length L of the waveguide 10 and the desired amount of compression length change $\Delta L$ or wavelength shift $\Delta\lambda$. For example, for an outer diameter d2 of 1 mm, having a length L of 5 mm, the tuning range without buckling is about 64 nm (with FS=1.3); and for an outer diameter of 1 mm and a length L of about 20 mm, the tuning range without buckling is about 4 nm (with FS=1.3). An outer diameter d2 as low as 0.3 mm will likely provide acceptable performance, depending on the grating length and desired tuning range.

The waveguide 10 may be made using fiber drawing techniques now known or later developed that provide the resultant desired dimensions for the core and the outer diameter discussed hereinbefore. As such, the external surface of the waveguide 10 will likely be optically flat, thereby allowing Bragg gratings to be written through the cladding similar to that which is done for conventional optical fiber. Because the waveguide 10 has a large outer diameter compared to that of a standard optical fiber (e.g., 125 microns), the waveguide 10 may not need to be coated with a buffer and then stripped to write the gratings, thereby requiring less steps than that needed for conventional optical fiber gratings. Also, the large outer diameter d2 of the waveguide 10 allows the waveguide to be ground, etched or machined while retaining the mechanical strength of the waveguide 10. Thus, the present invention is easily manufacturable and easy to handle. Also, the waveguide 10 may be made in long lengths (on the order of many inches, feet, or meters) then cut to size as needed for the desired application.

Also, the waveguide 10 does not exhibit mechanical degradation from surface ablation common with optical fibers under high laser fluence (or power or intensity) during grating exposure (or writing). In particular, the thickness of the cladding between the cladding outer diameter and the core outer diameter causes a reduced power level at the air-to-glass interface for a focused writing beam.

Figure 8:
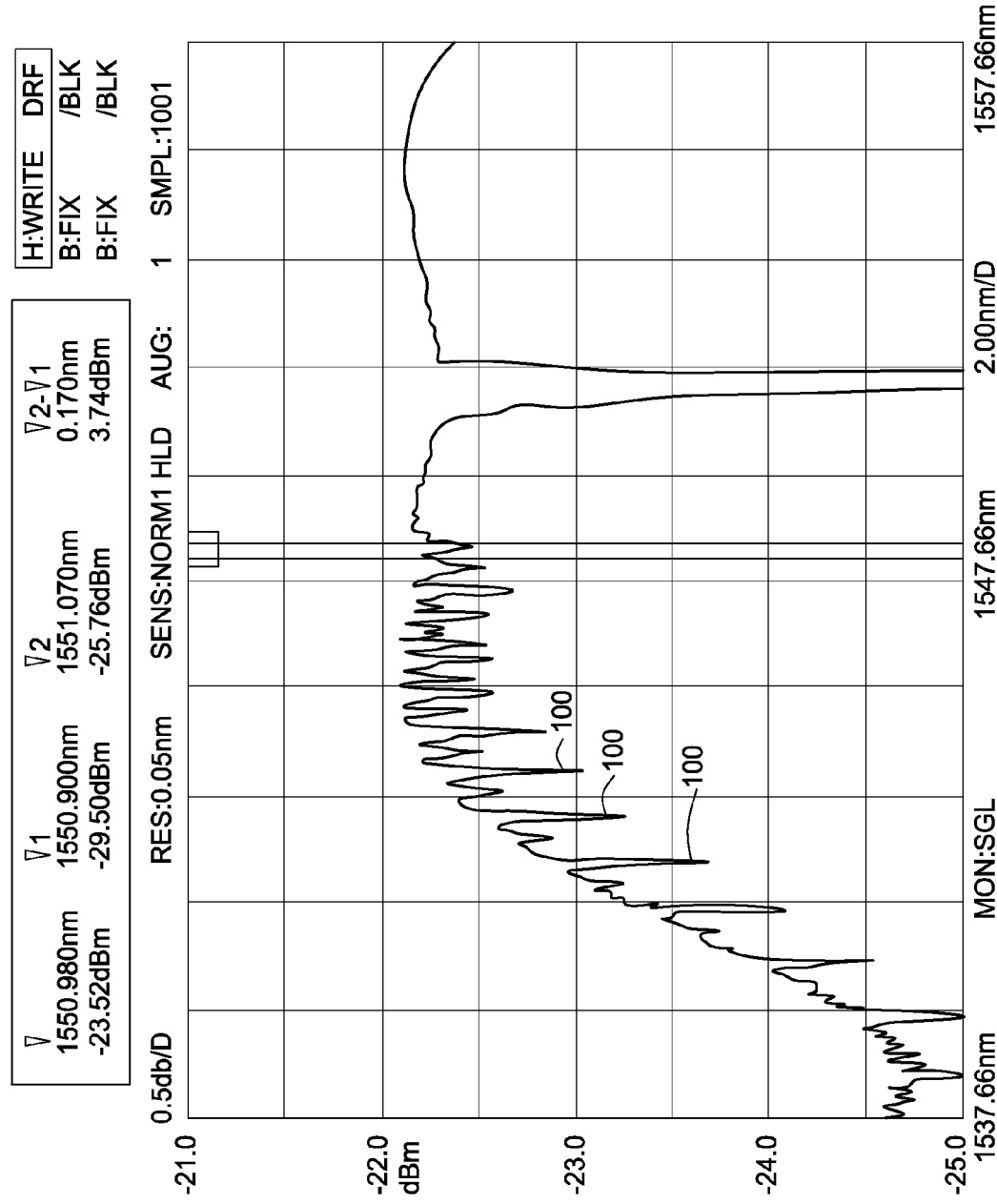
FIG. 8 is a graph of an optical transmission profile of a grating in a standard optical fiber showing cladding mode coupling, in accordance with the present invention.
Figure 9:
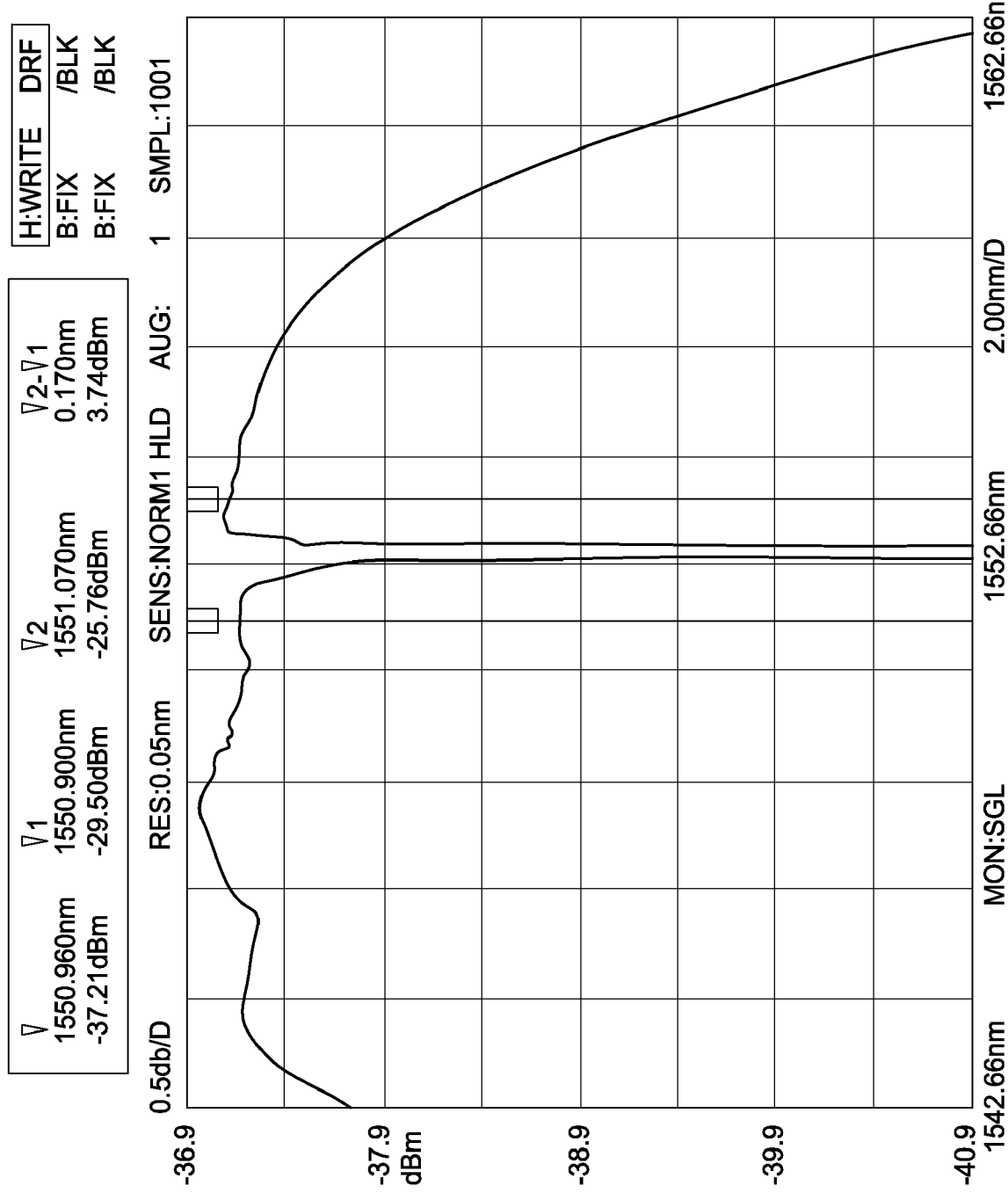
FIG. 9 is a graph of an optical transmission profile of a grating in a large diameter optical waveguide showing reduced cladding mode coupling, in accordance with the present invention.

Referring to FIGS. 8 and 9, we have also found that the present invention also reduces coupling between the core and cladding modes due to the increased end cross-sectional area between the core and cladding of the waveguide. Thus, a grating 16 written in the core 12 of the waveguide 10 exhibits less optical transmission loss and exhibits a cleaner optical profile than a conventional fiber grating because the large cladding region dissipates coupled cladding modes, thereby reducing the coupling of the core 12 to the cladding 14 modes. In general, the greater the difference in cross-sectional area between the core 12 and the cladding 14 the smaller the mode field overlap and the lower the coupling to the cladding modes. The thickness of the cladding 14 between the cladding outer diameter and the core outer diameter may be set to optimize this effect FIG. 8 shows an optical transmission profile for a standard grating in an optical fiber having a 9 micron core diameter and 125 micron outer diameter. Such a grating exhibits coupling to the cladding modes as indicated by the spikes 100. FIG. 9 shows an optical transmission profile for a standard grating written in the waveguide 10 having a 9 micron core diameter and a 3 mm outer diameter which exhibits greatly reduced coupling to the cladding modes as indicated by the lack of spikes on the profile. Other diameters of the core 12 and waveguide 10 may be used if desired such that the cladding modes are reduced to the desired levels.

Also, the waveguide 10 has a large end surface area to attach an optical fiber pigtail to the waveguide 10 or for attaching multiple optical fibers to multiple cores in the waveguide 10. Also, the size of the waveguide 10 has inherent mechanical rigidity which improves packaging options and reduces bend losses.

The side cross-section of the outer surface of the waveguide 10 may have a varying geometry, depending on the application. For example, the waveguide 10 may have a "dogbone" shape having a narrow central section 20 and larger outer sections 21. The dogbone shape may be used to provide increased sensitivity in converting axial force to length change $\Delta L$ and/or wavelength shift $\Delta \lambda$ of the grating 16 and may be achieved by etching, grinding, machining, heating and stretching, or other known techniques.

The waveguide 10 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

Figure 3:
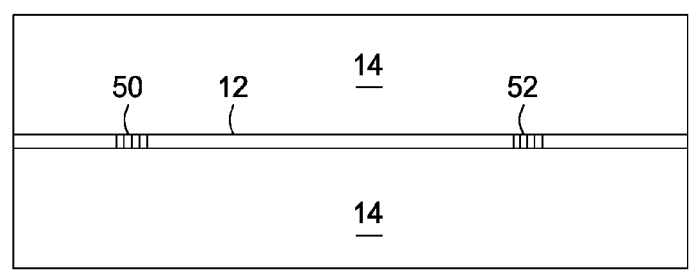
FIG. 3 is a side view of a large diameter waveguide having a pair of gratings embedded therein, in accordance with the present invention.

Referring to FIG. 3, for any of the embodiments described herein, instead of a single grating encased within the waveguide 10, two or more gratings 50, 52 may be embedded in the waveguide 10. The gratings 50, 52 may have the same reflection wavelengths and/or profiles or different wavelengths and/or profiles. The multiple gratings 50, 52 may be used individually in a known Fabry Perot arrangement.

Further, one or more fiber lasers, such as that described in U.S. Pat. No. 5,666,372, "Compression-Tuned Fiber Laser" (which is incorporated herein by reference to the extent necessary to understand the present invention) may be in the waveguide 10 and may be compression-tuned. In that case, the gratings 50, 52 form a cavity and the waveguide 10 at least between the gratings 50, 52 (and may also include the gratings 50, 52, and/or the waveguide 10 outside the gratings, if desired) at least a portion of which is doped with a rare earth dopant, e.g., erbium and/or ytterbium, etc., and the lasing wavelength would be tuned accordingly as the force on the waveguide 10 changes.

Figure 4:
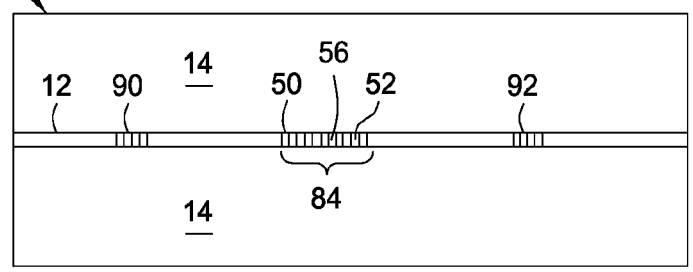
FIG. 4 is a side view of a large diameter waveguide having a DFB laser embedded therein, in accordance with the present invention.

Referring to FIG. 4, another type of tunable fiber laser that may be used is a tunable distributed feedback (DFB) fiber laser, such as that described in V. C. Lauridsen et al.; "Design of DFB Fibre Lasers," Electronic Letters, Oct. 15, 1998, Vol. 34, No. 21, pp 2028-2030; P. Varming, et al., "Erbium Doped Fiber DGB Laser With Permanent $\pi/2$ Phase-Shift Induced by UV Post-Processing," IOOC'95, Tech. Digest, Vol. 5, PD1-3, 1995; U.S. Pat. No. 5,771,251; "Optical Fibre Distributed Feedback Laser," to Kringlebotn et al.; or U.S. Pat. No. 5,511,083, "Polarized Fiber Laser Source," to D'Amato et al. In that case, a grating 84 is written in a rare-earth doped core and configured to have a phase shift of $\lambda/2$ (where $\lambda$ is the lasing wavelength) at a predetermined location 56 near the center of the grating 16 which provides a well defined resonance condition that may be continuously tuned in single longitudinal mode operation without mode hopping, as is known. Alternatively, instead of a single grating, the two gratings 50, 52 (FIG. 3) may be placed close enough to form a cavity having a length of $(N+\frac{1}{2})\lambda$, where N is an integer (including 0) and the gratings 50, 52 are in rare-earth doped fiber. The gratings 50, 52 may have the same reflection wavelengths and/or profiles or different wavelengths and/or profiles.

Alternatively, the DFB laser 84 may be located in the waveguide 10 between a pair of gratings 90, 92 where the core 12 is doped with a rare-earth dopant at least a portion of the distance between the gratings 90, 92. Such configuration is referred to as an "interactive fiber laser," such as is described by J. J. Pan et al., "Interactive Fiber Lasers with Low Noise and Controlled Output Power," E-tek Dynamics, Inc., San Jose Calif., internet web site www.e-tek.com/products/whitepapers. Other single or multiple fiber laser configurations may be disposed in the waveguide 10 if desired.

Figure 5:
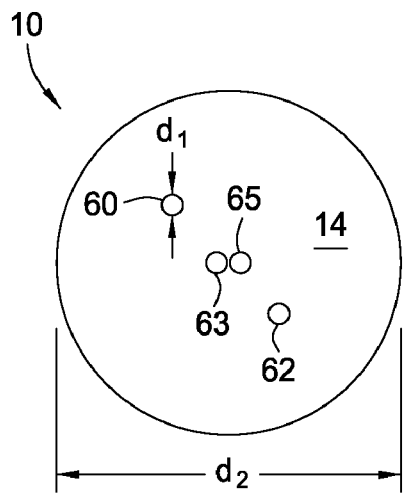
FIG. 5 is an end view of a large diameter optical waveguide having two optical cores, in accordance with the present invention.

Referring to FIG. 5, alternatively, two or more cores 60, 62, 63, 65 may be located within the waveguide 10. The core 12 (FIGS. 1-4) may be positioned axially anywhere within the waveguide 10 and need not be centered along the center line of the waveguide 10. Also, cores (FIG. 5) may be located close to each other (to be substantially touching or optically coupling to each other) as shown by the cores 63, 65, and/or separated by any desired distance within the waveguide 10, as shown by cores 60, 62. For multiple cores with different diameters, each of the cores should meet the requirements described herein for the core 12.

Figure 6:
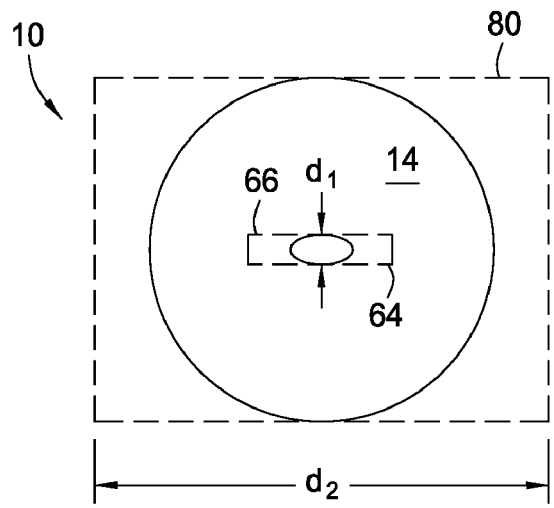
FIG. 6 is an end view of a: large diameter optical waveguide having an elliptical core, in accordance with the present invention.

Referring to FIG. 6, alternatively, the core 12 may have an asymmetrical end cross-sectional shape such as elliptical shape 64 or a rectangular shape 66. For asymmetrical end cross-sectional shapes, the smaller dimension d1 would be used for determining the maximum core dimension. In that case, the core may propagate only one mode in the direction of the dimension d1 and propagate a few modes in the other direction. Also, the end cross-sectional shape of the core may have other shapes such as a square, clam-shell, octagonal, multi-sided, or any other desired shapes.

Also, the outer geometry may have end cross-sectional shapes, such as a rectangle shown by dashed lines 80 if desired. In that case, the larger dimension d2 would be used for determining the minimum outer dimension.

Figure 7:
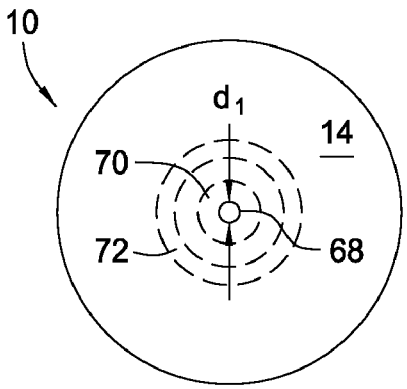
FIG. 7 is an end view of a large diameter optical waveguide having a plurality of concentric optical cores, in accordance with the present invention.

Referring to FIG. 7, alternatively, the waveguide may have multiple concentric cores 68, 70 or a ring or annulus core 72. In that case, the dimension d1 for calculating the minimum dimension for the core would be the core having the smallest outer dimension.

The dimensions and geometries for any of the embodiments described herein are merely for illustrative purposes and, as such, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A method of producing an optical waveguide, comprising:

selecting an outer cladding material;

selecting an inner core material substantially similar to the outer cladding material; and drawing a preform having the inner core material disposed within the outer cladding material under suitable conditions to produce the optical waveguide having at least one inner core having a first shape and an outer cladding having a second shape different than the first shape, wherein an outer transverse dimension of the second shape is greater than or equal to 0.3 mm.

2. The method of claim 1, further comprising preparing at least one end surface of the optical waveguide for optically coupling with an optical fiber having a diameter substantially smaller in diameter than the end surface.

3. The method of claim 2, further comprising writing reflective gratings through the cladding.

4. The method of claim 1, further comprising at least one of grinding, etching, or machining the optical waveguide resulting in a middle longitudinal portion of the waveguide having a reduced diameter relative to surrounding longitudinal portions.

5. The method of claim 1, wherein the waveguide produced comprises multiple inner cores disposed within the outer cladding.

6. The method of claim 1, wherein the first shape comprises at least one of a circular shape and an elliptical shape.

7. The method of claim 6, wherein the second shape comprises at least one of a rectangle and a square.

8. The method of claim 1, wherein at least one of the first and second shapes is asymmetrical.

9. The method of claim 1, wherein the inner core is not positioned within the center of the second shape.

10. The method of claim 5, wherein the multiple cores are concentric.

11. A method of producing an optical waveguide, comprising:
    selecting a cladding material;
    selecting a core material substantially similar to the cladding material; and
    drawing a preform having the core material disposed within the cladding material such that the optical waveguide produced thereby has at least one core having a first shape disposed within a cladding having a second shape different than the first shape, wherein at least one of the first and second shapes is neither circular nor elliptical, wherein an outer transverse dimension of the second shape is greater than or equal to 0.3 mm.

12. The method of claim 11, further comprising preparing at least one end surface of the optical waveguide for optically coupling with an optical fiber having an outer dimension substantially smaller than an outer dimension of the end surface.

13. The method of claim 11, further comprising writing reflective gratings through the cladding.

14. The method of claim 11, further comprising at least one of grinding, etching, or machining the optical waveguide resulting in a middle longitudinal portion of the waveguide having a reduced dimension relative to surrounding longitudinal portions.

15. The method of claim 11, wherein the waveguide produced comprises multiple cores disposed within the cladding.

16. The method of claim 15, wherein the multiple cores are concentric.

17. The method of claim 11, wherein the first shape comprises at least one of a circular shape and an elliptical shape.

18. The method of claim 17, wherein the second shape comprises at least one of a rectangular shape and a square shape.

19. The method of claim 11, wherein the first shape or the second shape comprises an octagonal shape or a clam-shell shape.

* * * * *